US012719823B2

(12) United States Patent
Lewis et al.

(10) Patent No.: US 12,719,823 B2
(45) **Date of Patent: *Aug. 25, 2026**

(54) METHODS, SYSTEMS, AND MEDIA FOR IDENTIFYING AND PRESENTING VIDEO OBJECTS LINKED TO A SOURCE VIDEO

(71) Applicant: GOOGLE LLC, Mountain View, CA (US)

(72) Inventors: Justin Lewis, Marina Del Rey, CA (US); Ruxandra Georgiana Davies, Santa Monica, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/655,043

(22) Filed: May 3, 2024

(65) Prior Publication Data

US 2024/0291784 A1 Aug. 29, 2024

Related U.S. Application Data

(63) Continuation of application No. 17/539,193, filed on Nov. 30, 2021, now Pat. No. 11,997,062, which is a (Continued)

(51) Int. Cl.
*H04L 51/10* (2022.01)
*G06F 16/48* (2019.01)
(Continued)

(52) U.S. Cl.
CPC .............. *H04L 51/10* (2013.01); *G06F 16/48* (2019.01); *G06F 16/735* (2019.01); *G06F 16/9535* (2019.01); *H04L 51/52* (2022.05)

(58) Field of Classification Search
CPC ......... H04L 51/10; H04L 51/52; H04L 51/04; G06F 16/48; G06F 16/5866;
(Continued)

(56) References Cited

U.S. PATENT DOCUMENTS 8,935,713 B1 1/2015 Gabel et al.
10,057,636 B1 * 8/2018 Nijim ................ H04N 21/4325
(Continued)

OTHER PUBLICATIONS

Non-Final Office Action for U.S. Appl. No. 16/174,815 dated Oct. 8, 2019 (8 pages).
(Continued)

*Primary Examiner* — Jungwon Chang
(74) *Attorney, Agent, or Firm* — MARSHALL, GERSTEIN & BORUN LLP

(57) ABSTRACT

Methods, systems, and media for identifying video objects linked to a source video are provided. In some embodiments, the method comprises: identifying demographic attributes corresponding to a first user participating in an online conversation; determining at least one keyword associated with the online conversation, wherein the keyword indicates a topic of the online conversation; identifying a video object based at least on the demographic attributes and the at least one keyword, wherein the video object comprises a portion of a video; causing the identified video object to be presented in a group of video objects on a first user device associated with the first user; receiving an indication that the identified video object has been selected on the first user device for inclusion in a message in the online conversation; and causing the identified video object to be presented on a second user device associated with the second user.

20 Claims, 11 Drawing Sheets

Related U.S. Application Data continuation of application No. 16/881,639, filed on May 22, 2020, now Pat. No. 11,190,471, which is a continuation of application No. 16/174,815, filed on Oct. 30, 2018, now Pat. No. 10,666,589, which is a continuation of application No. 14/964,894, filed on Dec. 10, 2015, now Pat. No. 10,116,603.

(51) Int. Cl.
*G06F 16/735* (2019.01)
*G06F 16/9535* (2019.01)
*H04L 51/52* (2022.01)

(58) Field of Classification Search
CPC .............. G06F 16/9535; G06F 16/735; G06Q 30/0267; G06Q 30/0251; G06Q 30/0641
USPC .......................................................... 709/206
See application file for complete search history.

(56) References Cited

U.S. PATENT DOCUMENTS 10,057,651 B1 * 8/2018 Singh ................. H04N 21/4394
10,116,603 B1 * 10/2018 Lewis ..................... G06F 16/48
10,666,589 B2 * 5/2020 Lewis ..................... H04L 51/52
11,190,471 B2 * 11/2021 Lewis ..................... H04L 51/10
11,997,062 B2 * 5/2024 Lewis ..................... G06F 16/48
2009/0112683 A1 4/2009 Hamilton, II et al.
2009/0156181 A1 6/2009 Athsani
2010/0159883 A1 6/2010 Pascal
2011/0071901 A1 3/2011 Fries
2011/0208822 A1 8/2011 Rathod
2012/0157134 A1 6/2012 Lee
2012/0246191 A1 9/2012 Xiong
2012/0324493 A1 * 12/2012 Holmdahl ............ H04N 21/252 725/86
2012/0331384 A1 * 12/2012 Islam ................. G06Q 30/0641 715/716
2013/0031489 A1 1/2013 Gubin
2013/0060875 A1 3/2013 Burnett et al.
2013/0073336 A1 3/2013 Heath
2013/0144968 A1 * 6/2013 Berger ................... G06Q 50/01 709/217
2013/0290091 A1 10/2013 Benyamin
2014/0137144 A1 5/2014 Jarvenpaa
2014/0143355 A1 * 5/2014 Berdis ..................... H04L 51/04 709/206
2014/0149487 A1 5/2014 Dikmen
2014/0215360 A1 * 7/2014 Degani ................. G06F 3/0481 715/753
2015/0193889 A1 * 7/2015 Garg .................. G06Q 30/0251 705/14.49
2015/0235672 A1 * 8/2015 Cudak .................. H04N 21/252 386/241
2015/0278292 A1 10/2015 James
2015/0286371 A1 10/2015 Degani
2015/0286790 A1 * 10/2015 Ahmad .................. G16H 40/20 705/2
2015/0324858 A1 * 11/2015 DeMattei ........... G06Q 30/0267 705/14.64
2016/0094501 A1 3/2016 Lee
2016/0154825 A1 * 6/2016 Yao ..................... G06F 16/5866 382/218
2016/0164815 A1 6/2016 Cho
2016/0180560 A1 6/2016 Patel
2016/0255494 A1 9/2016 Shin et al.
2017/0026669 A1 1/2017 Newell
2017/0048184 A1 2/2017 Lewis et al.
2017/0105048 A1 * 4/2017 Stein ....................... G06F 16/48
2019/0124021 A1 4/2019 DeMattei

OTHER PUBLICATIONS

Notice of Allowance for U.S. Appl. No. 16/174,815 dated Jun. 27, 2018 (8 pages). <5b4BR>Notice of Allowance for U.S. Appl. No. 16/174,815 dated Jan. 22, 2020 (7 pages).
Notice of Allowance on U.S. Appl. No. 14/964,894 dated Jun. 27, 2018.

* cited by examiner

METHODS, SYSTEMS, AND MEDIA FOR IDENTIFYING AND PRESENTING VIDEO OBJECTS LINKED TO A SOURCE VIDEO

RELATED APPLICATIONS

This application claims the benefit of and priority under 35 U.S.C. 120 as a continuation of U.S. patent application Ser. No. 17/539,193, entitled "Methods, Systems, and Media For Identifying and Presenting Video Objects Linked to A Source Video," filed Mar. 24, 2022, which claims the benefit of and priority under 35 U.S.C. 120 as a continuation of U.S. patent application Ser. No. 16/881,639, entitled "Methods, Systems, and Media For Identifying and Presenting Video Objects Linked to A Source Video," filed May 22, 2020, which claims the benefit of and priority under 35 U.S.C. 120 as a continuation of U.S. patent application Ser. No. 16/174,815, entitled "Identifying Transitions Within Media Content Items," filed Oct. 30, 2018, which claims the benefit of and priority under 35 U.S.C. 120 as a continuation of U.S. patent application Ser. No. 14/964,894, entitled "Methods, Systems, and Media For Identifying and Presenting Video Objects Linked to A Source Video," filed Dec. 10, 2015, the contents of which are incorporated herein by reference.

TECHNICAL FIELD

The disclosed subject matter relates to methods, systems, and media for identifying and presenting video objects linked to a source video.

BACKGROUND

Creators of media content often want to encourage viewers to view, share, and interact with their content. However, a viewer must make a conscious decision to share the video, by, for example, posting links to the content on a social networking service. This is generally not conducive to sharing the content more than once or sharing the content with multiple groups.

Accordingly, it is desirable to provide methods, systems, and media for identifying and presenting video objects linked to a source video.

SUMMARY

Methods, systems, and media for identifying and presenting video objects linked to a source video are provided. In accordance with some embodiments of the disclosed subject matter, a method for identifying video objects linked to a source video is provided, the method comprising: identifying demographic attributes corresponding to a first user participating in an online conversation with a second user; determining at least one keyword associated with the online conversation, wherein the keyword indicates a topic of the online conversation; identifying a video object based at least on the demographic attributes and the at least one keyword, wherein the video object comprises a portion of a video; causing the identified video object to be presented in a group of video objects on a first user device associated with the first user; receiving an indication that the identified video object has been selected on the first user device for inclusion in a message in the online conversation; and causing the identified video object to be presented on a second user device associated with the second user.

In accordance with some embodiments of the disclosed subject matter, a system for identifying video objects linked to a source video is provided, the system comprising: a hardware processor that is programmed to: identify demographic attributes corresponding to a first user participating in an online conversation with a second user; determine at least one keyword associated with the online conversation, wherein the keyword indicates a topic of the online conversation; identify a video object based at least on the demographic attributes and the at least one keyword, wherein the video object comprises a portion of a video; cause the identified video object to be presented in a group of video objects on a first user device associated with the first user; receive an indication that the identified video object has been selected on the first user device for inclusion in a message in the online conversation; and cause the identified video object to be presented on a second user device associated with the second user.

In accordance with some embodiments of the disclosed subject matter, non-transitory computer-readable media containing computer executable instructions, that, when executed by a processor, cause the processor to perform a method for identifying video objects linked to a source video are provided. The method comprises: identifying demographic attributes corresponding to a first user participating in an online conversation with a second user; determining at least one keyword associated with the online conversation, wherein the keyword indicates a topic of the online conversation; identifying a video object based at least on the demographic attributes and the at least one keyword, wherein the video object comprises a portion of a video; causing the identified video object to be presented in a group of video objects on a first user device associated with the first user; receiving an indication that the identified video object has been selected on the first user device for inclusion in a message in the online conversation; and causing the identified video object to be presented on a second user device associated with the second user.

In accordance with some embodiments of the disclosed subject matter, a system for identifying video objects linked to a source video is provided, the system comprising: means for identifying demographic attributes corresponding to a first user participating in an online conversation with a second user; means for determining at least one keyword associated with the online conversation, wherein the keyword indicates a topic of the online conversation; means for identifying a video object based at least on the demographic attributes and the at least one keyword, wherein the video object comprises a portion of a video; means for causing the identified video object to be presented in a group of video objects on a first user device associated with the first user; means for receiving an indication that the identified video object has been selected on the first user device for inclusion in a message in the online conversation; and means for causing the identified video object to be presented on a second user device associated with the second user.

In some embodiments, the keyword indicates a sentiment associated with the online conversation.

In some embodiments, the keyword indicates a media content item being discussed in the online conversation.

In some embodiments, the video object is identified based on criteria specified by a creator of the video object.

In some embodiments, the system further comprises means for receiving text from the first user device, wherein the video object is presented on the second user device with the text overlaid on the video object.

In some embodiments, the video object is identified based on demographic attributes associated with the second user.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1A:
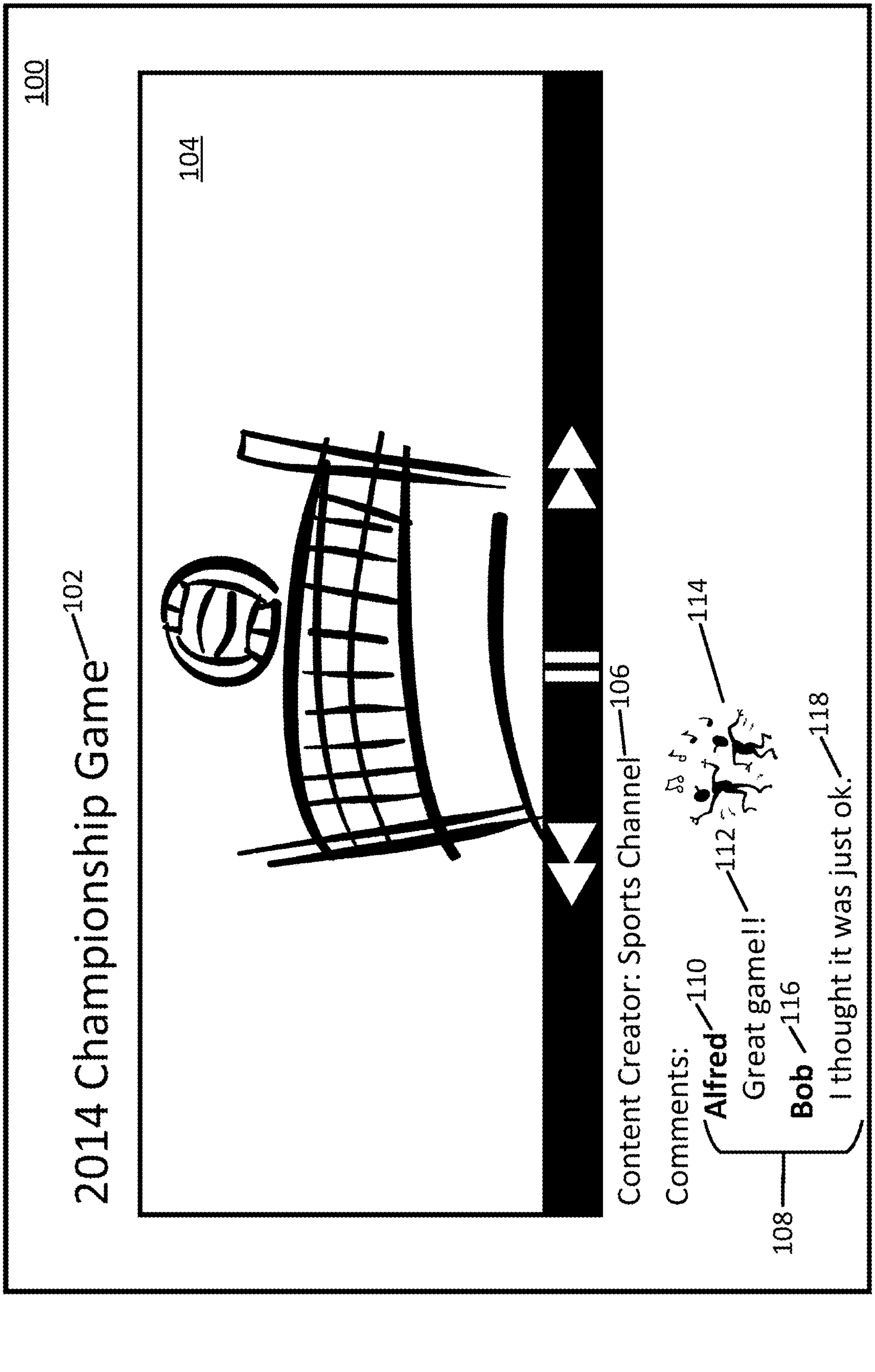
FIGS. 1A-1D show examples of user interfaces for presenting and inserting a video object in accordance with some embodiments of the disclosed subject matter.

In accordance with various embodiments, mechanisms (which can include methods, systems, and media) for inserting and presenting video objects linked to a source video are provided.

In some embodiments, the mechanisms described herein can cause a video object, identified using a first user device, to be presented on a second user device. In some embodiments, the video object can be associated with a video. For example, in some embodiments, the video object can represent any suitable portion of the video. As a more particular example, in some embodiments, the video object can correspond to a subset of frames of the video. Additionally, in some embodiments, the video object can include audio content. In some embodiments, the video object can be associated with or can be linked to the video that was used to create the video object.

In some embodiments, the mechanisms can cause the video object to be presented. For example, in some embodiments, the video object can be presented in association with and/or as a portion of a comment (e.g., in a comment section of a web page, in a comments section of a feed item in a social networking service, and/or in any other suitable context) entered using the first user device. As another example, in some embodiments, the video object can be presented in association with a message directed to one or more other users in a chat application executed by the first user device. As still another example, in some embodiments, the video object can be presented as a message directed to one or more other users without associated input, for example, in a chat application, as a text message, and/or in any other suitable context. The mechanisms can then cause the video object to be presented on the second user device, for example, in response to determining that the second user device has navigated to a user interface loading the comments section. As another example, the mechanisms can cause the video object to be presented on the second user device in response to determining that the second user device is associated with a target of the message sent by the first user device that includes a video object.

In some embodiments, the video object can correspond to a portion of a video associated with a particular content creator. Additionally, in some embodiments, use of the video object (e.g., by causing the video object to be inserted and/or presented) can be permitted for users associated with the content creator (e.g., users having a connection to the content creator on a social networking service, users subscribed to media content associated with the content creator, and/or any other suitable relationship to the content creator) and inhibited for users not associated with the content creator.

In some embodiments, the mechanisms described herein can cause one or more selectable inputs that each represent one or more video objects available for insertion to be presented on a first user device, and the mechanisms can receive a selection of one of the selectable inputs. The mechanisms can then identify a video object corresponding to the selected input and can cause the identified video object to be presented by a second user device. Additionally or alternatively, in some embodiments, the mechanisms described herein can identify a video object based on a sequence of characters received from the first user device. The mechanisms can then cause the video object identified based on the sequence of characters to be presented by the second user device.

In some embodiments, a video object can be linked and/or can be associated with a link to a video that was used to create the video object. In such embodiments, selection (e.g., by clicking on, tapping on, and/or any other suitable selection method) of the presented video object can cause a device that is presenting the video object to present the corresponding video.

In some embodiments, the mechanisms described herein can identify a video object to be presented in a in a message and/or an online conversation (e.g., a chat, a comment on a social networking site, a text message, and/or any other suitable online conversation) based on content of the online conversation. For example, in some embodiments, the mechanisms can identify one or more video objects based on particular content being discussed in the chat and/or a particular sentiment associated with the online conversation (e.g., excitement, disbelief, anger, and/or any other suitable sentiment). The mechanisms can then cause the identified video objects to be presented to one of the users in the online conversation for selection by the user, and the selected video object can then be included in the chat, as described below in connection with FIG. 8. Additionally or alternatively, in some embodiments, the mechanisms can identify the video object based on demographic attributes associated with participants in the online conversation. For example, in some embodiments, the mechanisms can access demographic profiles associated with participants, which can specify one or more demographic attributes associated with the user. The mechanisms can then identify video objects that are likely to be enjoyed by users associated with the demographic attributes of the participants in the online conversation. In some such embodiments, the user can enter text, and the mechanisms can cause a selected video object to be presented with the text overlaid.

FIG. 1A shows an example 100 of a user interface for presenting a video object in accordance with some embodiments of the disclosed subject matter. As illustrated, in some embodiments, user interface 100 can include a title 102, a media content item 104, a content identifier 106, comments 108, and/or a video object 114.

Title 102 can be any suitable title indicating content of user interface 100. In some embodiments, title 102 can include any suitable text, images, graphics, videos, animations, and/or any other suitable content. Note that the location of title 102 within user interface 100 is shown as an example, and title 102 can be located at any suitable position. In some embodiments, title 102 can be omitted.

Media content item 104 can include any suitable media content. For example, in some embodiments, media content item 104 can include any suitable audio and/or video content. In some embodiments, media content item 104 can be presented within a media content player, as shown in FIG. 1. Additionally, in some embodiments, the media content player can include any suitable controls such as a play input, a pause input, a volume control, and/or any other suitable controls. Note that the location of media content item 104 within user interface 100 is shown as an example, and media content item 104 can be located at any suitable position. In some embodiments, media content item 104 can be omitted.

Content identifier 106 can be any suitable indicator of a source of content associated with media content item 104. In some embodiments, the indicated channel can correspond to any suitable entity (e.g., identifying information associated with a creator of media content item 104, identifying information associated with a producer of media content item 104, identifying information associated with a creator of a collection of media content items that includes media content item 104, and/or any other suitable entity). In some embodiments, content identifier 106 can include any suitable text, images, graphics, animations, icons, and/or any other suitable content. Note that the location of content identifier 106 within user interface 100 is shown as an example, and content identifier 106 can be located at any suitable position.

Comments 108 can include any suitable comments related to media content item 104. In some embodiments, an individual comment within comments 108 can include a username and a comment body, such as usernames 110 and 116 and comment bodies 112 and 118. In some embodiments, usernames 110 and/or 116 can include any suitable text, images, icons, and/or any other suitable content corresponding to an author of a comment. In some embodiments, comment bodies 112 and/or 118 can include any suitable text, images, icons, and/or any other suitable content. Note that the position of comments 108 within user interface 100 is shown as an example, and comments 108 can be located at any suitable position.

Note that although only two comments are shown within comments 108, in some embodiments, any suitable number of comments (e.g., two, three, ten, twenty, and/or any other suitable number) can be included. Additionally or alternatively, in some embodiments, a subset of comments within comments 108 can be presented. For example, in some embodiments, the first n (e.g., two, five, ten, and/or any other suitable number) comments (e.g., the n most recently posted comments, the n most popular comments, and/or based on any other suitable ordering of n) can be presented in user interface 100, and more and/or different comments can be presented, for example, in response to an indication (e.g., in response to determining that a user has caused a user interface to scroll, in response to determining that a link has been selected, and/or any other suitable indication) that more and/or different comments are to be presented.

Figure 1B:
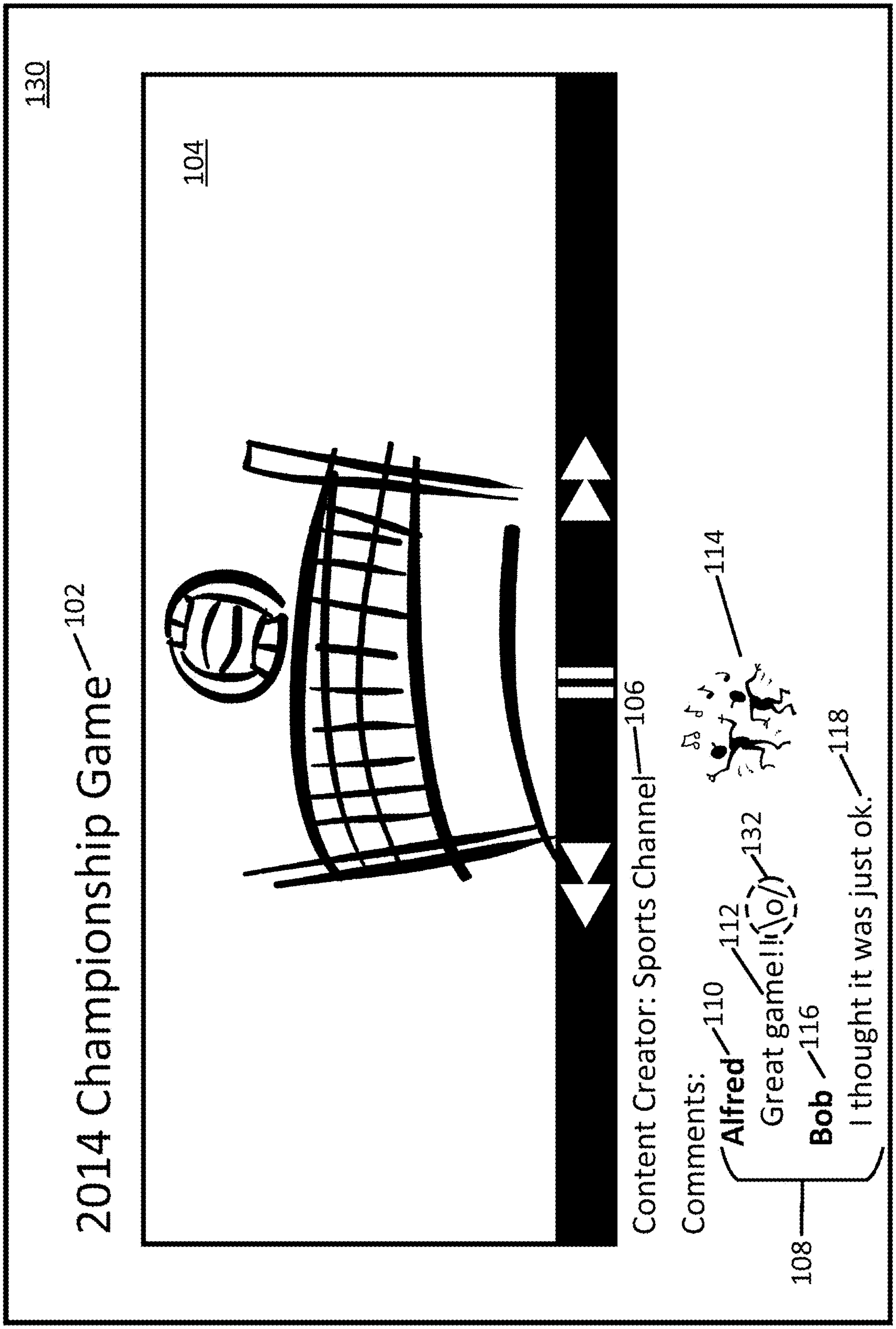

Video object 114 can be any suitable video object specified by the user associated with an individual comment of comments 108. In some embodiments, video object 114 can be presented in any suitable spatial relation to comment body 112. For example, as shown in FIGS. 1A and 1B, video object 114 can be presented adjacent (e.g., to the right of, to the left of, above, below, and/or any other suitable position) to comment body 112. Additionally or alternatively, in some embodiments, video object 114 can be presented within comment body 112. In cases where video object 114 includes audio content, the audio content can be presented in any suitable manner. For example, in some embodiments, the audio content can be presented in response to determining that a cursor is hovering over video object 114. As another example, in cases where multiple video objects are presented, audio content corresponding to any suitable subset (e.g., one, two, and/or any other number) of the video objects can be presented. In such an example, audio associated with a particular video object can be presented during playback of the video object.

In some embodiments, video object 114 can be selected from a collection of video objects. For example, as described below in connection with FIG. 1C, a collection of available video objects can be presented, and a creator of a comment and/or other message can select one or more of the video objects in the collection for insertion into the comment. In such embodiments, the selection of available video objects can be presented using any suitable techniques, for example, techniques described below in connection with FIGS. 4 and 5. Note that although only one video object is shown in FIG. 1A, in some embodiments, a comment creator can insert any suitable number of video objects. In some embodiments, in cases where two or more video objects are inserted, the two or more video objects can be concatenated into one video object, and play of one video object can automatically transition to play of the next video object. Alternatively, in some embodiments, the two or more video objects can be presented concurrently.

In some embodiments, video objects can be selected and inserted based on a sequence of characters included in a comment. FIG. 1B shows an example 130 of a user interface for presenting a video object that is indicated by a specific sequence of characters. As shown, in some embodiments, user interface 130 can include a sequence of characters 132.

Sequence of characters 132 can be any sequence of characters suitable for indicating a particular video object. For example, sequence of characters 132 can include any suitable letters, numbers, and/or any other suitable characters. In some embodiments, a beginning and an end of sequence of characters 132 can include delimiting characters (e.g., slashes, braces, brackets, parentheses, underscores, ampersands, percent symbols, and/or any other suitable characters). In some embodiments, sequence of characters 132 can additionally indicate a channel with which the indicated video object to be inserted is associated. As a specific example, a sequence of characters such as "{ch: sp\o/}" can indicate that the channel is one that corresponds to the identifier "sp," and that the video object to be inserted is one that corresponds to the characters "\o/". In some embodiments, after a sequence of characters is inserted within comment body 112, a server can identify the indicated video object (e.g., video object 114) based on sequence of characters 132 and can cause video object 114 to be presented, for example, as described below in connection with FIGS. 6 and 7.

In some embodiments, at least a portion of sequence of characters 132 can be hyperlinked to any suitable content. In some embodiments, selection of the hyperlink can cause a page associated with a creator of the associated video object to be presented. For example, in some embodiments, the page can include an indication of one or more additional and/or alternative video objects associated with the video object creator, as well as sequences of characters associated with the additional and/or alternative video objects. As another example, in some embodiments, the page can include an indication of one or more videos associated with the video object creator.

Note that, in some embodiments, video object 114 can be presented in connection with sequence of characters 132 (e.g., adjacent to, and/or in any other suitable position). Alternatively, in some embodiments, video object 114 can replace sequence of characters 132 as it is inserted.

Figure 1C:
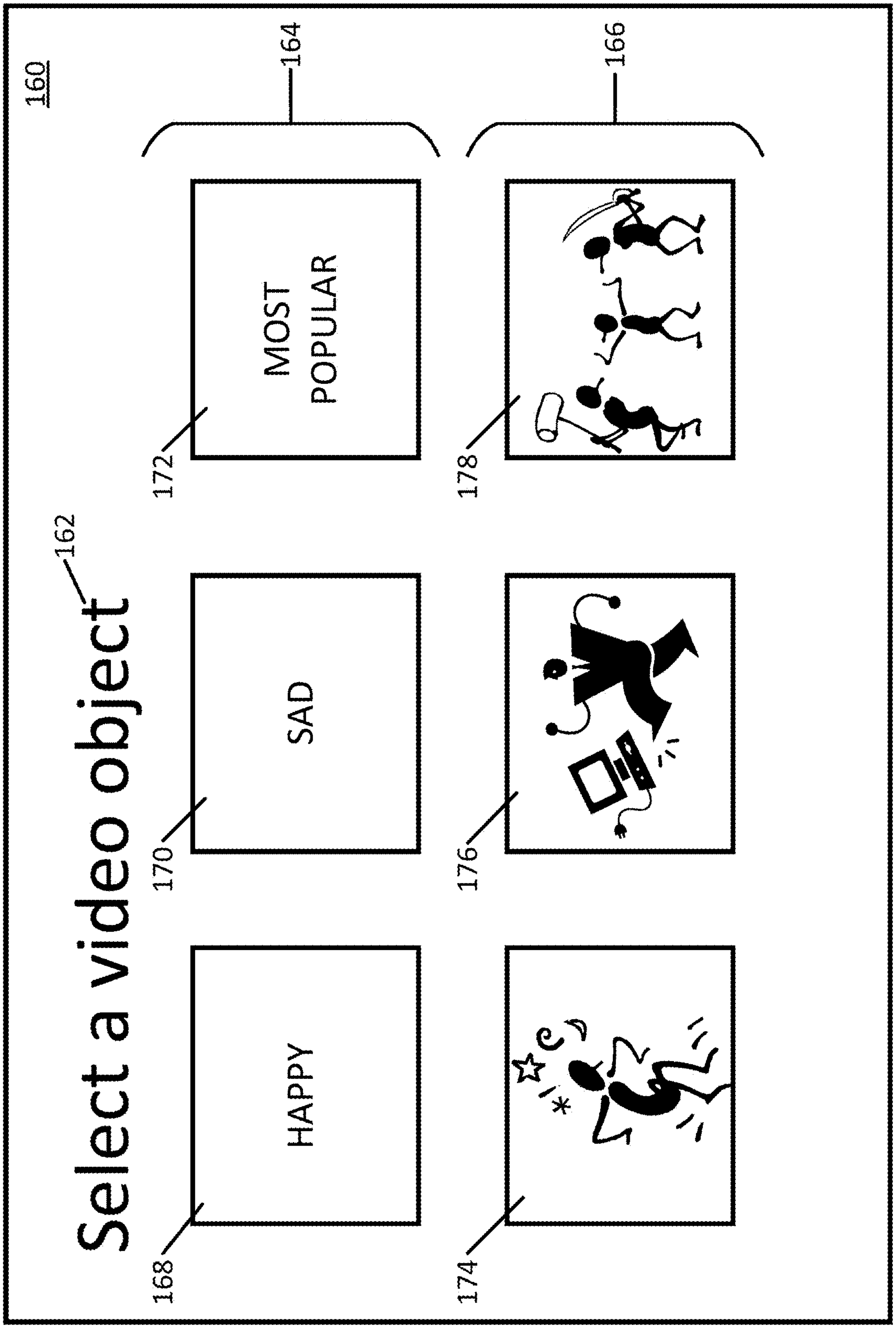

As described above in connection with FIG. 1A, in some embodiments, a particular video object can be selected from a collection of available video objects. FIG. 1C shows an example 160 of a user interface for presenting a collection of selectable inputs that each indicate one or more available video objects in accordance with some embodiments of the disclosed subject matter. Note that, in some embodiments, available video objects represented in user interface 160 can be restricted to any suitable group of video objects. For example, in some embodiments, the video objects can be restricted to those created by a particular content creator. As a more particular example, in some embodiments, the video objects can be restricted to those created by one or more content creators if the user being presented with user interface 160 is determined to have a relationship (e.g., connected to and/or following on a social networking service, subscribed to content associated with the content creator on a video sharing web site, and/or any other suitable relationship) with the content creator(s). As shown, user interface 160 can include a title 162, categories of video objects 164, and group of video objects 166.

Title 162 can be any suitable title for indicating that a video object can be selected from user interface 160. In some embodiments, title 162 can include any suitable text, images, graphics, icons, and/or any other suitable content. Note that the location of title 162 within user interface 160 is shown as an example, and title 162 can be located at any suitable position. In some embodiments, title 162 can be omitted.

Categories of video objects 164 and group of video objects 166 can correspond to any suitable categories of video objects or collection of video objects. For example, as shown in FIG. 1C, categories of video objects 164 can include selectable inputs that each represent a collection of video objects corresponding to a particular category. As a more particular example, categories of video objects 164 can include selectable inputs that represent a collection of video objects associated with a particular emotion (e.g., selectable inputs 168 and 170), selectable inputs that represent a collection of video objects based on popularity (e.g., selectable input 164), and/or any other suitable category (e.g., based on a frequency of use by a user presented with user interface 160, and/or any other suitable metric). In some embodiments, selection of a selectable input that corresponds to a category of video objects (e.g., one of selectable inputs 168-172) can cause video objects in the category of video objects to be presented within user interface 160.

As another example, group of video objects 166 can include selectable inputs that represent individual video objects that can be inserted (e.g., into a comment), such as selectable inputs 174, 176, and 178. In some embodiments, selection of one of selectable inputs 174-178 can cause a corresponding video object to be inserted, for example, next to and/or within a comment. In some embodiments, one or more of the video objects presented for selection using user interface 160 (e.g., as represented by selectable inputs 174-178) can be automatically played, for example, in response to determining that user interface 160 is being presented.

Note that the arrangement of selectable inputs 168-178, categories of video objects 164, and group of video objects 168 within user interface 160 is shown as an example. In some embodiments, any number of selectable inputs (e.g., two, four, ten, twenty, and/or any other suitable number) can be presented in any suitable arrangement (e.g., a grid, a row, a column, and/or any other suitable arrangement). Additionally or alternatively, in some embodiments, user interface 160 can include a selectable input that, when selected, can cause additional and/or alternative selectable inputs to be presented in user interface 160.

Figure 1D:
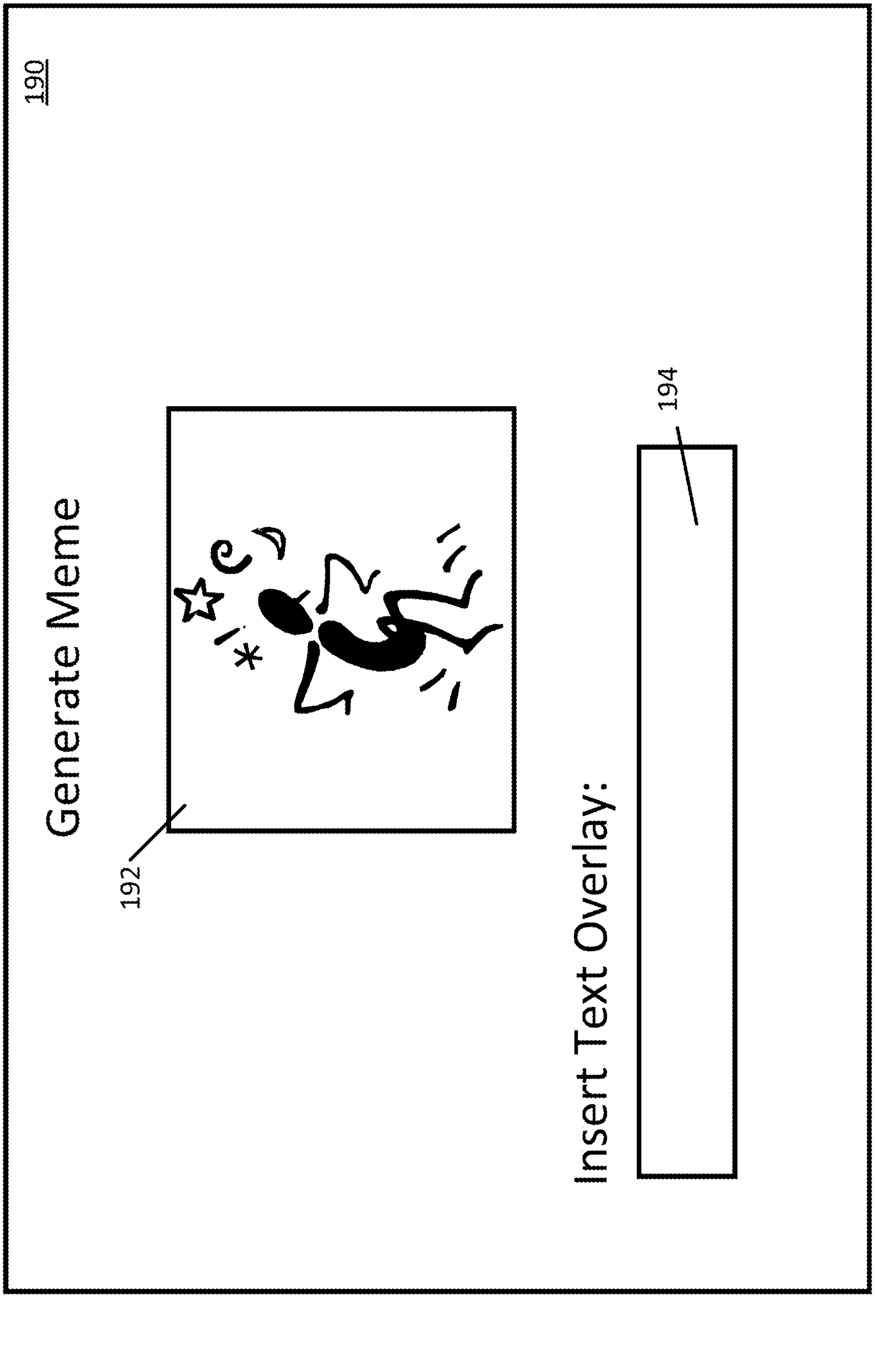

In some embodiments, a user can enter text to be overlaid on a video object, and the video object can then be presented with the overlaid text, for example, as a meme. FIG. 1D shows an example 190 of a user interface for receiving text from a user to overlay on a video object. As illustrated, user interface 190 can include a video object 192 and a text input 194.

Video object 192 can be any suitable video object on which text is to be overlaid. For example, in some embodiments, video object 192 can be a video object that has been selected by a user, for example, from a group of video objects available for selection. Additionally or alternatively, in some embodiments, video object 192 can be one that has been identified as relevant to a particular chat and/or conversation, as shown in and described below in connection with FIG. 8.

Text input 194 can be any suitable user interface control for receiving text from a user device that is presenting user interface 190. For example, as shown in FIG. 1D, text input 194 can be a text input box. In some embodiments, text can be entered in text input 194 via a keyboard, a touchscreen, and/or in any other suitable manner. As described below in connection with FIG. 8, text received in text input 194 can be overlaid on video object 192, and the video object with overlaid text can be presented as a meme, for example, in a chat, an online conversation, a comment on a social networking sit, and/or in any other suitable format.

Figure 2:
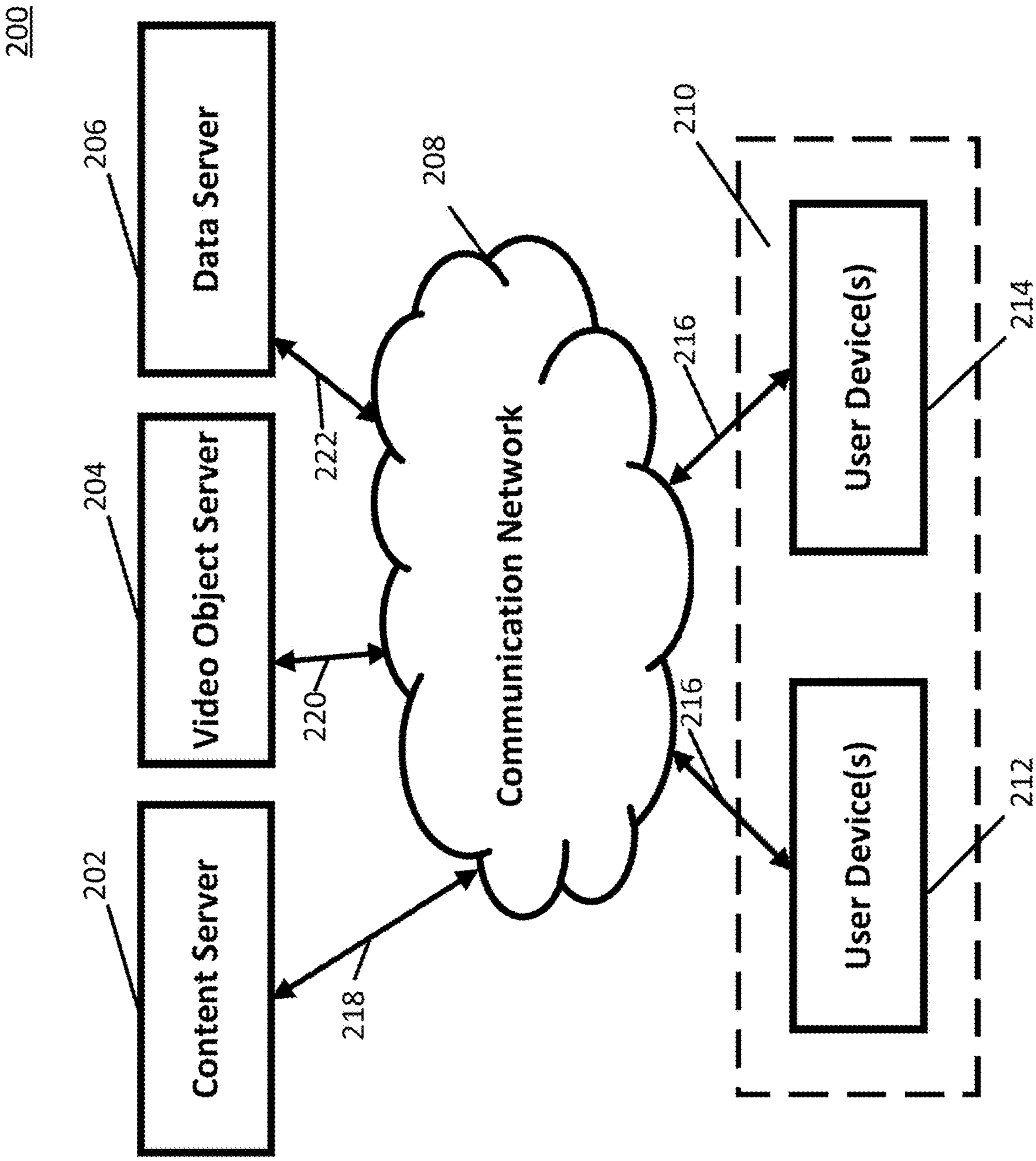
FIG. 2 shows a schematic diagram of an illustrative system suitable for implementation of mechanisms described herein for inserting and presenting video objects in accordance with some embodiments of the disclosed subject matter.

Turning to FIG. 2, an example 200 of hardware for presenting video objects that can be used in accordance with some embodiments of the disclosed subject matter is shown. As illustrated, hardware 200 can include one or more servers such as a content server 202, a video object server 204, and a data server 206, as well as a communication network 208, and/or one or more user devices 210, such as user devices 212 and 214.

In some embodiments, content server 202 can be any suitable server for storing media content and/or delivering such media content to a user device 210. For example, content server 202 can be a server that streams and/or otherwise transmits media content to a user device 210 via communication network 208. Media content provided by content server 202 can be any suitable content, such as video content, audio content, electronic books, documents, images, and/or any other suitable type of media content. As a more particular example, media content can include television programs, movies, cartoons, sound effects, live-streamed content (e.g., a streaming radio show, a live concert, and/or any other suitable type of streaming live content), and/or any other suitable type of media content. Media content can be created and/or uploaded to content server 202 by any suitable entity. In some embodiments, media content stored on content server 202 can be stored in association with an indicator of a creator and/or uploader of the media content. In some embodiments, content server 202 can be omitted.

In some embodiments, video object server 204 can be any suitable server for receiving and/or storing video objects, identifying video objects indicated by a user device 210, and/or causing an indicated video object to be presented. In some embodiments, video objects can be created by any suitable entity. In some embodiments, video object server 204 can store an indicator of a creator of a video object (e.g., a username, a name of a channel corresponding to a collection of media content, and/or any other suitable indicator of a creator) in association with the video object. Additionally or alternatively, in some embodiments, video object server 204 can store any information associated with a video object, such as a topic associated with the video object, sentiments associated with the video object, demographics attributes of users that might enjoy the video object, and/or any other suitable information. In some embodiments, video object server 204 can be omitted.

In some embodiments, data server 206 can be any suitable server for storing data associated with creation and/or use of video objects. For example, in some embodiments, data server 206 can store information related to popularity of particular video objects (e.g., a frequency with which a particular video object is selected for presentation, and/or any other suitable metrics). As another example, in some embodiments, data server 206 can store information related to the creation and/or use of video objects by users who insert video objects (e.g., participants in a chat, participants in a comments section of a web site and/or social networking service, and/or any other suitable users). In some embodiments, data server 206 can identify one or more video objects for inclusion in an online chat or conversation based on demographic profiles of users included in the chat and/or based on content of the chat, as shown in and described below in connection with FIG. 8. In some embodiments, data server 206 can be omitted.

Communication network 208 can be any suitable combination of one or more wired and/or wireless networks in some embodiments. For example, communication network 208 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 210 can be connected by one or more communications links 216 to communication network 208 that can be linked via one or more communications links (e.g., communications links 218, 220, and/or 222) to content server 202, video object server 204, and data server 206. Communications links 216, 218, 220, and/or 222 can be any communications links suitable for communicating data among user devices 210 and servers 202, 204, and/or 206 such as network links, dial-up links, wireless links, hard-wired links, any other suitable communications links, or any suitable combination of such links.

In some embodiments, user devices 210 can include any one or more user devices suitable for selecting a video object for presentation, presenting a video object, and/or any other suitable functions. For example, in some embodiments, user devices 210 can be implemented as a mobile device, such as a smartphone, mobile phone, a tablet computer, a laptop computer, a vehicle (e.g., a car, a boat, an airplane, or any other suitable vehicle) entertainment system, a portable media player, and/or any other suitable mobile device. As another example, in some embodiments, user devices 210 can be implemented as a non-mobile device such as a desktop computer, a set-top box, a television, a streaming media player, a game console, and/or any other suitable non-mobile device.

Although content server 202, video object server 204, and data server 206 are illustrated as separate devices, the functions performed by content server 202, video object server 204, and data server 206 can be performed using any suitable number of devices in some embodiments. For example, in some embodiments, the functions performed by any of content server 202, video object server 204, and/or data server 206 can be performed on a single server. As another example, in some embodiments, multiple devices can be used to implement the functions performed by content server 202, video object server 204, and/or data server 206.

Although two user devices 212 and 214 are shown in FIG. 2, any suitable number of user devices, and/or any suitable types of user devices, can be used in some embodiments.

Figure 3:
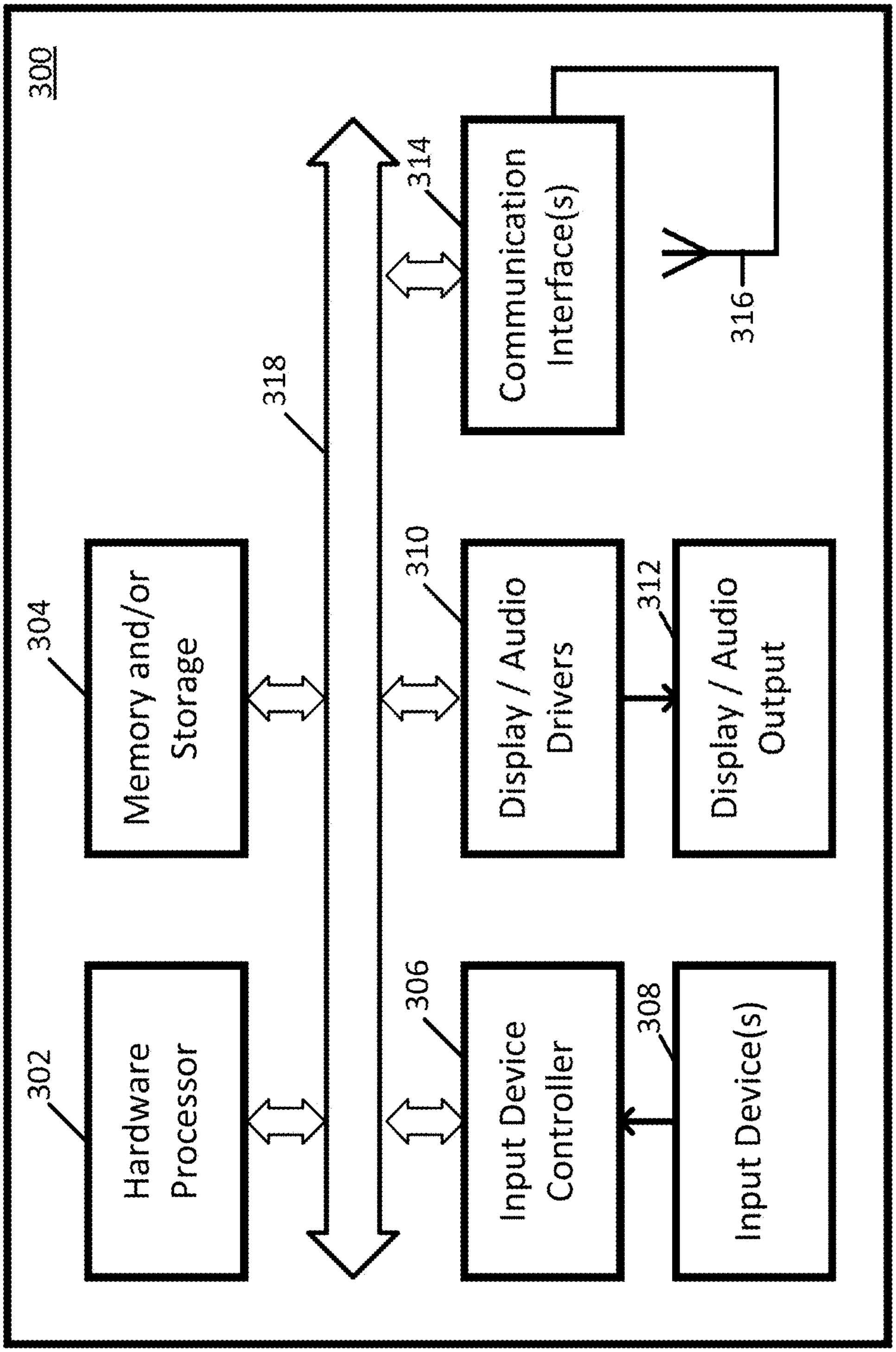
FIG. 3 shows a detailed example of hardware that can be used in a server and/or a user device of FIG. 2 in accordance with some embodiments of the disclosed subject matter.

Content server 202, video object server 204, data server 206, and user devices 210 can be implemented using any suitable hardware in some embodiments. For example, in some embodiments, devices 202, 204, 206, and 210 can be implemented using any suitable general purpose computer or special purpose computer. For example, a server may be implemented using a special purpose computer. Any such general purpose computer or special purpose computer can include any suitable hardware. For example, as illustrated in example hardware 300 of FIG. 3, such hardware can include hardware processor 302, memory and/or storage 304, an input device controller 306, an input device 308, display/audio drivers 310, display and audio output circuitry 312, communication interface(s) 314, an antenna 316, and a bus 318.

Hardware processor 302 can include any suitable hardware processor, such as a microprocessor, a micro-controller, digital signal processor(s), dedicated logic, and/or any other suitable circuitry for controlling the functioning of a general purpose computer or a special purpose computer in some embodiments. In some embodiments, hardware processor 302 can be controlled by a server program stored in memory and/or storage 304 of a server (e.g., such as one of servers 202-206). For example, the server program can cause hardware processor 302 to identify a collection of video objects to be presented for selection, identify a particular video object based on a received sequence of characters, cause an identified video object to be presented, and/or perform any other suitable actions. In some embodiments, hardware processor 302 can be controlled by a computer program stored in memory and/or storage 304 of user device 210. For example, the computer program can cause hardware processor 302 to present a collection of video objects for selection, present an identified video object, and/or perform any other suitable actions.

Memory and/or storage 304 can be any suitable memory and/or storage for storing video object information, programs, data, media content, and/or any other suitable information in some embodiments. For example, memory and/or storage 304 can include random access memory, read-only memory, flash memory, hard disk storage, optical media, and/or any other suitable memory.

Input device controller 306 can be any suitable circuitry for controlling and receiving input from one or more input devices 308 in some embodiments. For example, input device controller 306 can be circuitry for receiving input from a touchscreen, from a keyboard, from a mouse, from one or more buttons, from a voice recognition circuit, from a microphone, from a camera, from an optical sensor, from an accelerometer, from a temperature sensor, from a near field sensor, and/or any other type of input device.

Display/audio drivers 310 can be any suitable circuitry for controlling and driving output to one or more display/audio output devices 312 in some embodiments. For example, display/audio drivers 310 can be circuitry for driving a touchscreen, a flat-panel display, a cathode ray tube display, a projector, a speaker or speakers, and/or any other suitable display and/or presentation devices.

Communication interface(s) 314 can be any suitable circuitry for interfacing with one or more communication networks, such as network 208 as shown in FIG. 2. For example, interface(s) 314 can include network interface card circuitry, wireless communication circuitry, and/or any other suitable type of communication network circuitry.

Antenna 316 can be any suitable one or more antennas for wirelessly communicating with a communication network (e.g., communication network 208) in some embodiments. In some embodiments, antenna 316 can be omitted.

Bus 318 can be any suitable mechanism for communicating between two or more components 302, 304, 306, 310, and 314 in some embodiments.

Any other suitable components can be included in hardware 300 in accordance with some embodiments.

Figure 4:
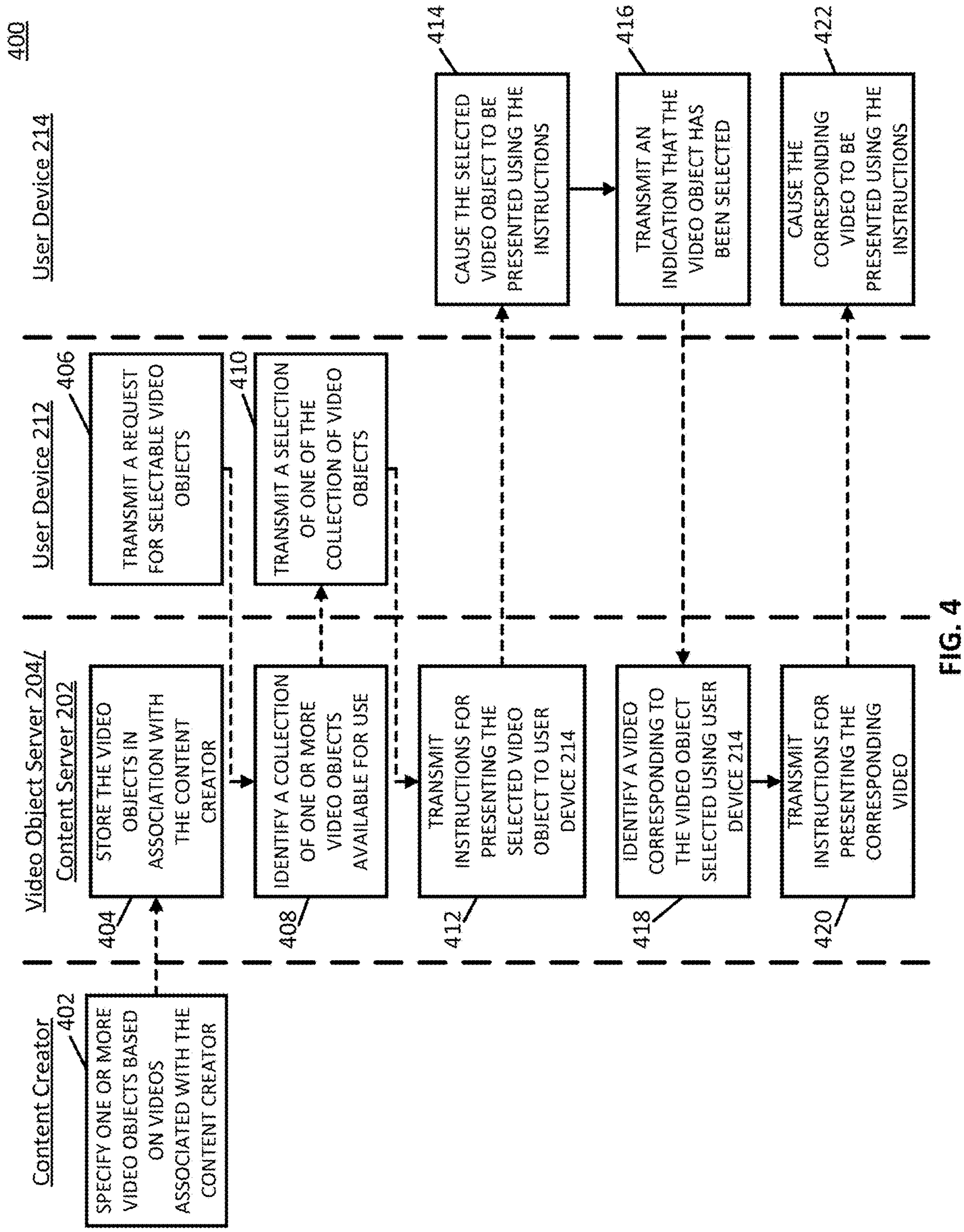
FIG. 4 shows an example of a data flow for presenting a video object selected from a collection of selectable inputs in accordance with some embodiments of the disclosed subject matter.

Turning to FIG. 4, an example 400 of an information flow diagram for presenting a video object selected based on a collection of selectable inputs is shown in accordance with some embodiments of the disclosed subject matter. In some embodiments, one or more portions of process 400 can be implemented on a device associated with a content creator, video object server 204, a first user device (e.g., user device 212), and/or a second user device (e.g., user device 214), as shown in FIG. 4.

Process 400 can begin when a content creator specifies one or more video objects based on videos associated with videos associated with the content creator at 402. In some embodiments, each video object can represent one or more portions of any suitable duration (e.g., one second, two seconds, five seconds, and/or any other suitable duration) of a corresponding video. Note that, in some embodiments, the video object can be a portion of any suitable type of video content (e.g., a movie, a television program, a commercial, a music video, and/or any other suitable type of video content). In some embodiments, the content creator can specify the one or more video objects by identifying the portion of the corresponding video to be used to create the video object(s) (e.g., by specifying timestamps from the video corresponding to a start time and an end time for the video object). In some embodiments, the content creator can specify a video from which a video object is to be created, and video object server 204 can automatically identify a portion of the video to use to create the video object. Additionally, in some embodiments, the content creator can specify one or more categories and/or other metadata with which the one or more video objects are to be associated. For example, in some embodiments, the content creator can specify an emotion related to each video object, keywords related to each video object, and/or any other suitable information and/or categories.

Note that, in some embodiments, a user other than the content creator of a video can create a video object based on that video. For example, the user other than the content creator of the video can identify a particular video and can specify one or more portions of the video to use in creating the video object. In such embodiments, the content creator associated with the video can be notified of the created video object. Additionally, in some embodiments, the user other than the content creator of the video can be permitted to create a video object using the video if the user has a relationship with the content creator, for example, on a social networking service and/or a video sharing site.

At 404, video object server 204 can store the video objects in association with information identifying the content creator associated with the video object(s). Video object server 204 can store the video objects in any suitable manner. For example, in some embodiments, the video objects can be stored in association with a name of the content creator, a particular channel of media content associated with the content creator, and/or in association with any other suitable information.

At 406, user device 212 can transmit a request for a collection of selectable video objects. The request can be transmitted in response to any suitable information. For example, in some embodiments, the request can be transmitted in response to an indication that a user of user device 212 has initiated a process to insert a video object (e.g., in association with a comment, in a chat window, and/or in any other suitable instance). As a more particular example, in some embodiments, the process to insert a video object can include a user selecting an input to cause available video objects to be presented.

At 408, video object server 204 can identify a collection of one or more video objects available for use in response to the request from user device 212. Video object server 204 can identify the collection of one or more video objects based on any suitable information and/or criteria. For example, in some embodiments, video object server 204 can identify a collection of video objects associated with a particular content creator (e.g., created by a content creator on whose content a user of user device 212 is commenting and/or sharing). As a more particular example, in some embodiments, video object server 204 can determine if user device 212 is associated with a particular content creator (e.g.: by determining if a user of user device 212 is connected to the content creator on a social networking service; by determining if a user of user device 212 has subscribed to content created by the content creator on a social networking service, a video sharing site, and/or any other suitable site; and/or any other suitable association). In some embodiments, after identifying the collection of one or more video objects available for use, video object server 204 can transmit instructions for rendering the collection of video objects to user device 212.

At 410, user device 212 can cause at least a subset of the collection of one or more video objects to be presented as selectable inputs, each representing at least one of the one or more video objects in the collection. User device 212 can cause the collection of video objects to be presented in any suitable manner. For example, in some embodiments, the collection of video objects can be presented in any suitable layout, such as the layout shown in FIG. 1C. As shown in and described in connection with FIG. 1C, in some embodiments, a selectable input can correspond to a category of video objects, selection of which can cause individual video objects to be presented. In some embodiments, after selectable inputs representing the collection of video objects are presented on user device 212, user device 212 can receive a selection of one of the collection of video objects, and can transmit information indicating which video object has been selected to video object server 204.

At 412, video object server 204 can transmit instructions to cause the selected video object to be presented to user device 214. In some embodiments, video object server 204 can transmit the instructions using any suitable techniques, such as techniques described below in connection with FIG. 5. In some embodiments, video object server 204 can transmit the instructions in response to any suitable information. For example, in some embodiments, video object server 204 can transmit the instructions in response to determining that user device 214 has navigated to a page on which a comment associated with the selected video object is to be presented (e.g., by navigating to the comments section associated with the inserted video object, by navigating to the live chat associated with the inserted video object, and/or by navigating to any other suitable context). As another example, in some embodiments, video object server 204 can transmit the instructions in response to determining that user device 214 is a target of a message that includes the selected video object.

At 414, user device 214 can cause the selected video object to be presented using the received instructions. In some embodiments, the selected video object can be presented in any suitable manner. For example, in some embodiments, the selected video object can be presented in association with a comment from a user of user device 212 (e.g., the first user device), as shown in and described above in connection with FIG. 1A. As another example, in some embodiments, the selected video object can be presented in association with a message from a user of user device 212 that are directed at a user of user device 214. As yet another example, in some embodiments, the selected video object can be presented in association with a feed item created by a user of user device 212 in an aggregated feed of news items presented in association with a social networking service.

At 416, user device 214 can receive an indication that a portion of the selected video object has been selected and can transmit an indication of the selection to video object server 204 and/or content server 202. In some embodiments, user device 214 can determine that a portion of the selected video object has been selected using any suitable information. For example, in some embodiments, user device 214 can determine that the presented video object has been clicked on and/or tapped. In some embodiments, user device 214 can additionally include information indicating an identity of the selected video object.

At 418, content server 202 and/or video object server 204 can identify a video corresponding to the indicated video object. In some embodiments, content server 202 and/or video object server 204 can identify the video using any suitable information and any suitable technique, for example, as described below in connection with 508 of FIG. 5.

At 420, video object server 204 can transmit instructions for presenting the corresponding video to user device 214 and/or can cause user device 214 to present the corresponding video. In some embodiments, the instructions can include any suitable information, as described below in connection with 510 of FIG. 5.

At 422, user device 214 can cause the corresponding video to be presented using the received instructions. In some embodiments, the corresponding video can be presented in any suitable manner. For example, in some embodiments, the corresponding video can be presented in a user interface in which the selected video object was presented. As another example, the corresponding video can be presented in a new user interface (e.g., a new window, a new tab, and/or any other suitable new user interface).

Note that, in some embodiments, selection of the video object can cause information associated with a content creator with which the video object is associated to be presented. For example, in some embodiments, the information can be presented as a web page or a portion of a web page that includes other video objects associated with the content creator. As another example, in some embodiments, information can be presented as a web page or a portion of a web page that includes media content associated with the content creator.

Figure 5:
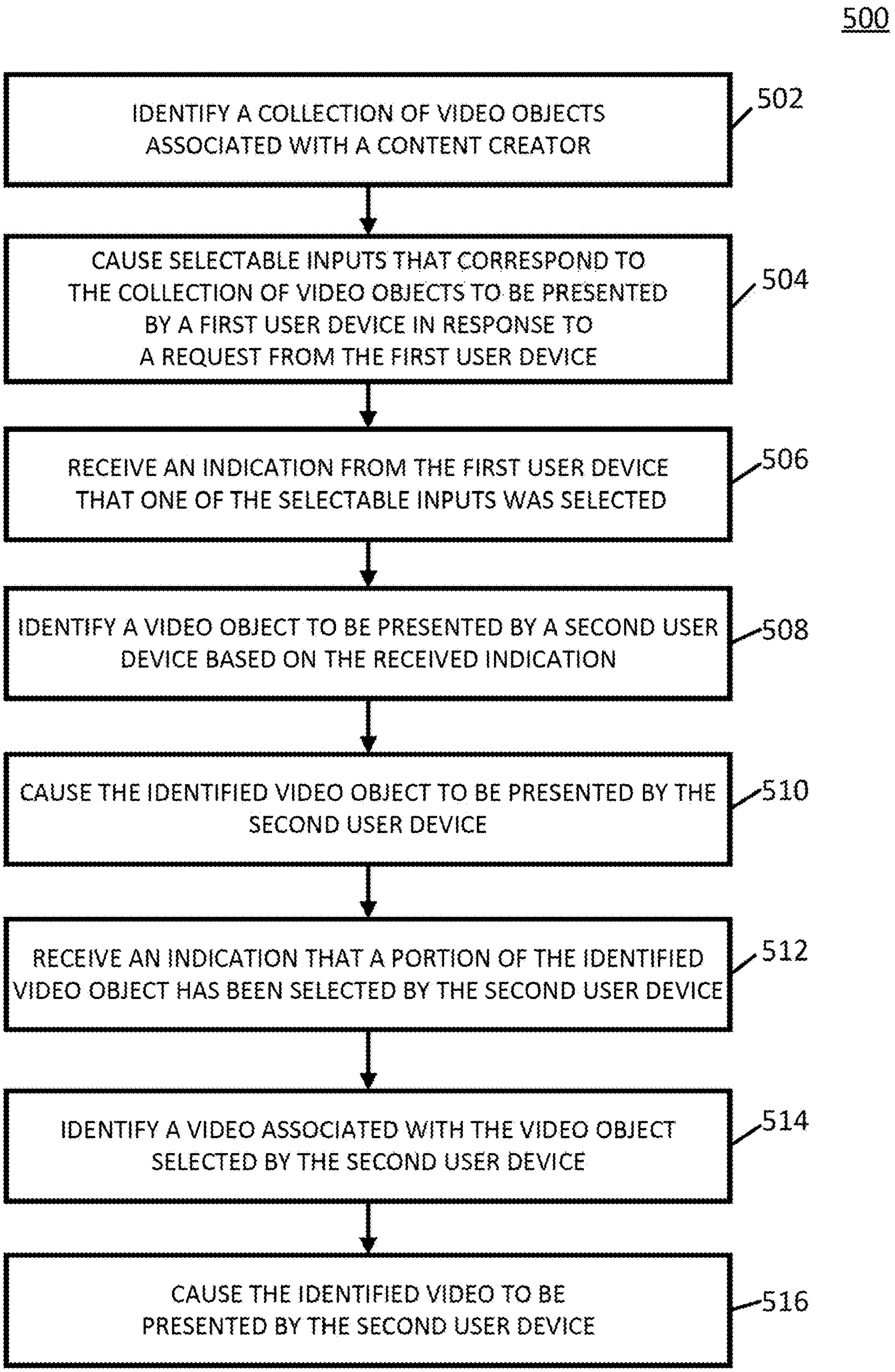
FIG. 5 shows an example of a process for presenting a video object selected from a collection of selectable inputs in accordance with some embodiments of the disclosed subject matter.

Turning to FIG. 5, an example 500 of a process for presenting a video object selected from a collection of selectable inputs is shown in accordance with some embodiments of the disclosed subject matter. In some embodiments, one or more portions of process 500 can be executed by video object server 204.

Process 500 can begin by identifying a collection of video objects associated with a content creator at 502 using any suitable technique or combination of techniques. For example, in some embodiments, process 500 can identify one or more video objects specified by the content creator, for example, as described above in connection with 402 of FIG. 4. As another example, in some embodiments, process 500 can identify video objects specified by the content creator that are associated with a particular category. In some embodiments, the categories can include a particular channel of media content associated with the content creator, associated with a particular genre of media content, associated with a particular program, and/or any other suitable category.

Process 500 can cause selectable inputs that correspond to the identified collection of video objects to be presented by a first user device at 504 in response to receiving a request from the first user device. For example, in some embodiments, process 500 can receive a request from the first user device when the first user device determines that a video object is to be inserted (e.g., in a comment, in a chat, and/or in any other suitable context). Process 500 can cause the selectable inputs that correspond to the collection of video objects to be presented in any suitable manner. For example, in some embodiments, process 500 can cause the selectable inputs to be presented in a layout similar to that shown in FIG. 1C. As a more particular example, in some embodiments, process 500 can transmit rendering instructions to the first user device that cause the first user device to present the selectable inputs. In some embodiments, in cases where a selectable input corresponds to a category (e.g., selectable inputs 168-172 of FIG. 1C), the transmitted instructions can indicate that video objects associated with the category are to be presented in response to determining that the input has been selected.

Note that, in some embodiments, process 500 can cause the selectable inputs to be presented in response to determining that a user of user device 212 is associated with a particular content creator. For example, process 500 can determine that a user of user device 212 has shared content associated with the content creator, commented on content associated with the content creator, subscribed to a channel of media content associated with the content creator, commented on and/or otherwise interacted with a post associated with the content creator (e.g., on a social networking service), and/or any other suitable association.

Process 500 can receive an indication from the first user device that one of the selectable inputs was selected at 506. For example, in some embodiments, the indication can include information specifying a video object that was selected using the first user device. As a more particular example, the indication can include an identifier associated with the corresponding video object, an identifier of a content creator associated with the corresponding video object, and/or any other suitable information.

Process 500 can identify a video object to be presented by a second user device based on the received indication at 508 using any suitable technique or combination of techniques. For example, in some embodiments, process 500 can identify the video object based on a link associated with the video object.

Process 500 can cause the identified video object to be presented by the second user device at 510 using any suitable technique or combination of techniques. For example, in some embodiments, process 500 can transmit instructions to the second user device that, when executed by the second user device, cause the second user device to present the video object. As a more particular example, in some embodiments, the second user device can cause the video object to be presented in association with a comment (e.g., in a comments section of a web site, in a chat, and/or in any other suitable manner), as shown in and described above in connection with FIGS. 1A and 1B. In some embodiments, the transmitted instructions can include a link to a video corresponding to the video object to be presented.

Process 500 can receive an indication that presented video object has been selected using the second user device at 512. For example, in some embodiments, the received indication can include information indicating that a portion of the presented video object has been clicked on and/or tapped using a user interface of the second user device. In some embodiments, the indication can include any suitable information, such as a timestamp associated with the selection, a username associated with the second user device, and/or any other suitable information.

Process 500 can identify a video associated with the video object at 514 using any suitable technique or combination of techniques. For example, in some embodiments, process 500 can use information (e.g., an identifier) embedded in a link associated with the selected video object to identify the corresponding video. In some embodiments, the identified video can be stored on content server 202, and process 500 can cause at least a portion of the identified video to be transmitted from content server 202 to the second user device via communication network 208.

Process 500 can cause the identified video to be presented by the second user device at 516 using any suitable technique or combination of techniques. For example, in some embodiments, process 500 can transmit instructions to the second user device that, when executed by the second user device, cause the second user device to begin presenting the identified video. As described above in connection with 422 of FIG. 4, in some embodiments, process 500 can cause the identified video to be presented by the second user device within the user interface in which the associated video object was presented or within a different user interface (e.g., by opening a new tab and/or window). As another example, in some embodiments, process 500 can cause the identified video to be presented by opening a particular application and causing the identified video to be presented using the application.

Figure 6:
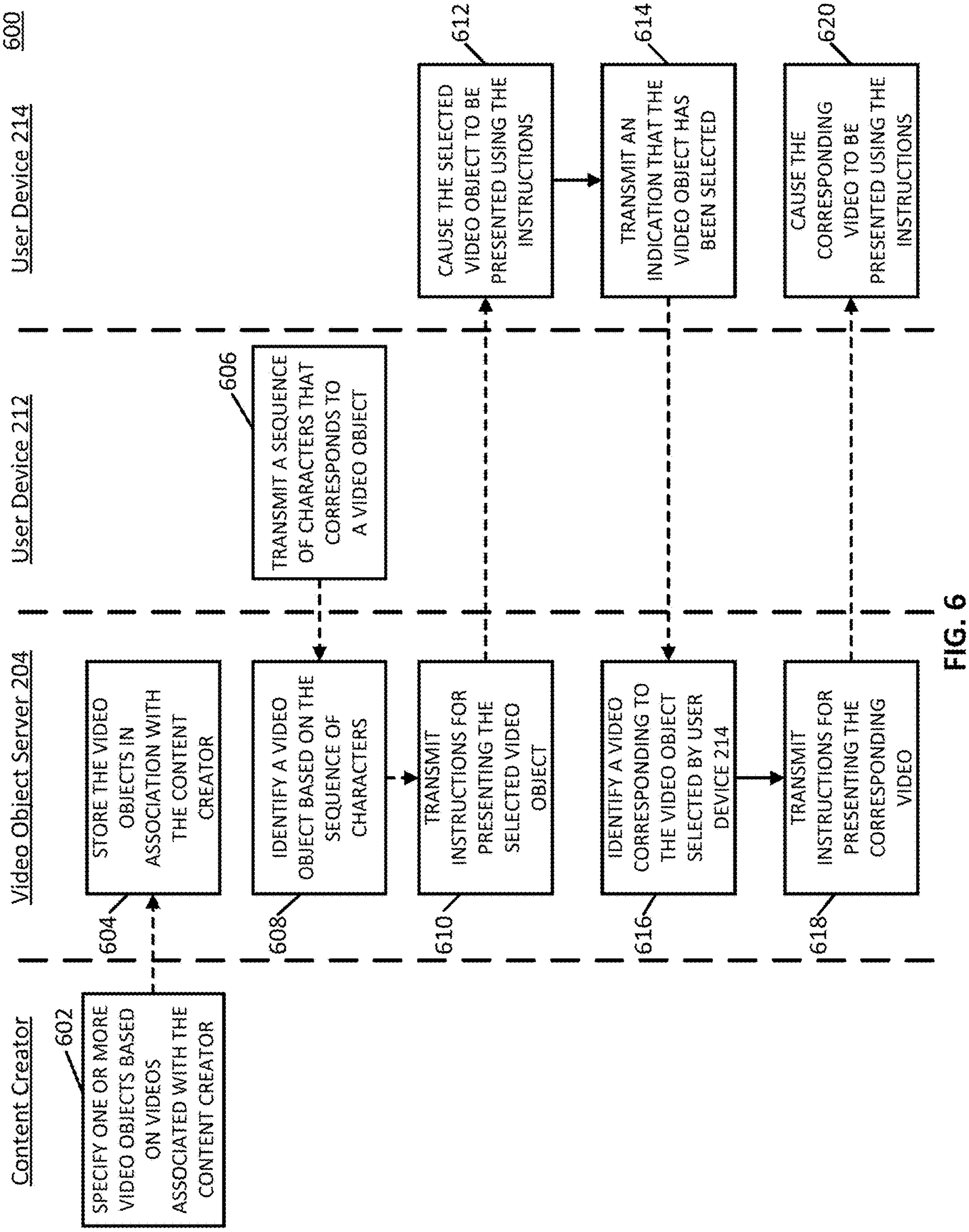
FIG. 6 shows an example of a data flow for presenting a video object identified based on a sequence of characters in accordance with some embodiments of the disclosed subject matter.

Turning to FIG. 6, an information flow diagram for identifying a video object based on a sequence of characters and causing the identified video object to be presented is shown in accordance with some embodiments of the disclosed subject matter.

Similarly to block 402 as described above in connection with FIG. 4, a content creator can specify one or more video objects that are available for use that are based on videos associated with the content creator at 602. In some embodiments, the content creator can specify a sequence of characters associated with each video object that, when inserted by user device 212, cause the video object to be presented.

At 604, video object server 204 can store the video objects in association with the content creator similarly to as described above in connection with block 404 of FIG. 4. Additionally or alternatively, in some embodiments, video object server 204 can store a character sequence specified by the content creator in association with the corresponding video object.

At 606, user device 212 can transmit a sequence of characters that represents a video object to video object server 204. As described above in connection with FIG. 1B, the sequence of characters can include any suitable characters and can be of any suitable length. Furthermore, in some embodiments, the sequence of characters can be delimited by any suitable characters (e.g., slashes, brackets, braces, underscores, ampersands, percent signs, and/or any other suitable characters) to differentiate the sequence of characters from text included in a comment and/or chat. Alternatively, in some embodiments, the sequence of characters can be inserted within a block of text without delimiters. Additionally, in some embodiments, one or more video objects corresponding to a particular sequence of characters can be presented as a preview prior to insertion.

At 608, video object server 204 can identify the video object that corresponds to the sequence of characters received from user device 212. Video object server 204 can identify the video object using any suitable technique or combination of techniques, such as those described below in connection with 704 of FIG. 7.

At 610, video object server 204 can transmit instructions for presenting the identified video object to a second user device (e.g., user device 214). Video object 204 can transmit the instructions using any suitable technique or combination of techniques, for example, techniques described above in connection with 412 of FIG. 4.

At 612, user device 214 can cause the video object to be presented using the received instructions. In some embodiments, the video object can be presented in any suitable manner. For example, in some embodiments, the video object can be presented in connection with the sequence of characters, as shown in and described above in connection with FIG. 1B. As another example, in some embodiments, the video object can be presented in place of the sequence of characters. In some embodiments, the received instructions can cause the sequence of characters to become hyperlinked, for example, to a page associated with the content creator, a video corresponding to the video object, and/or any other suitable content, as described above in connection with FIG. 1B.

At 614, user device 214 can transmit information indicating that a portion of the video object has been selected, for example, as described above in connection with 416 of FIG. 4.

At 616, video object server 204 can identify a video corresponding to the indicated video object, using techniques similar to those described above in connection with 418 of FIG. 4. At 618, video object server 204 can transmit instructions to user device 214 for presenting the corresponding video, for example, as described above in connection with 420 of FIG. 4.

At 620, user device 214 can cause the corresponding video to be presented using the received instructions, as described above in connection with FIG. 4.

Figure 7:
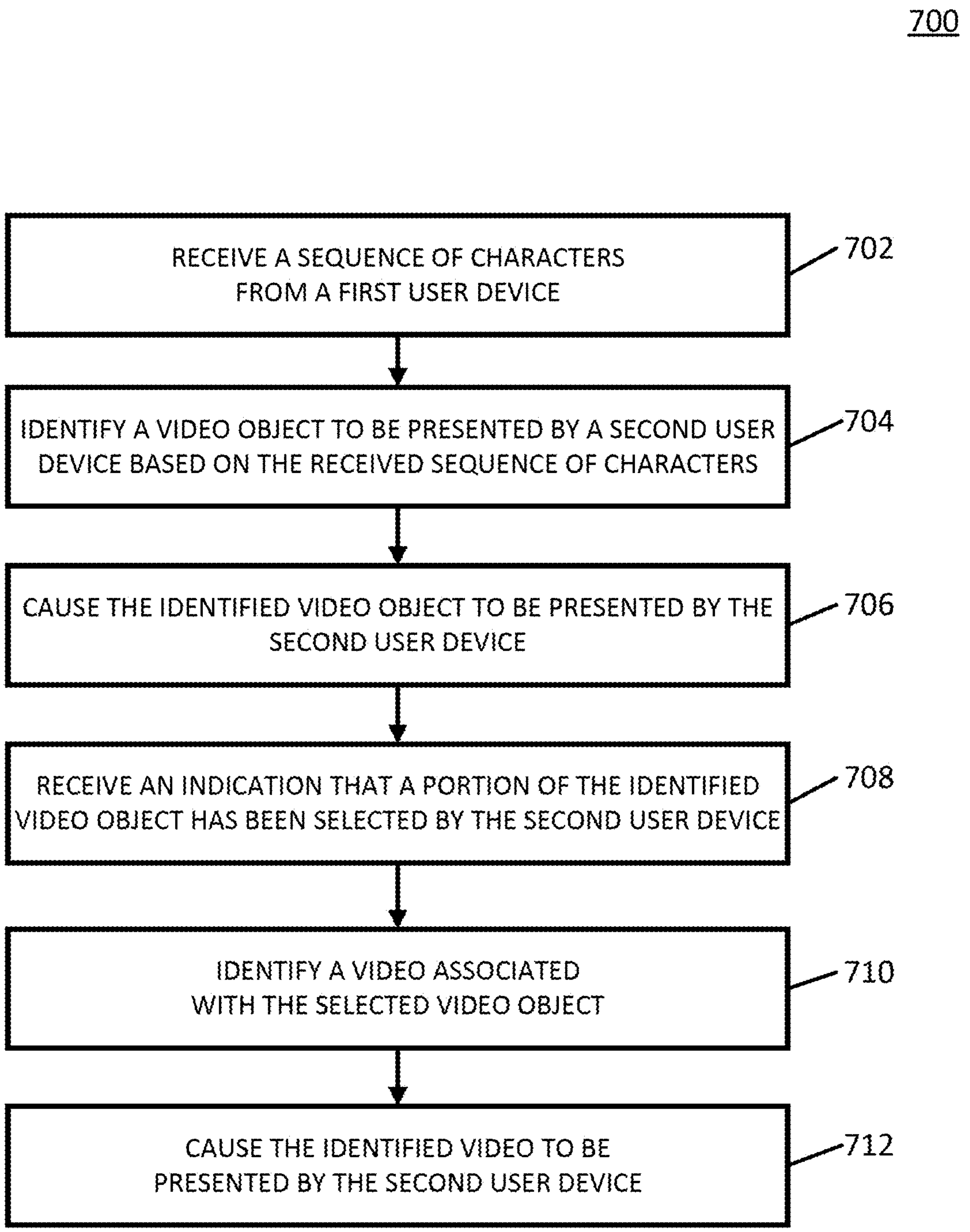
FIG. 7 shows an example of a process for presenting a video object identified based on a sequence of characters in accordance with some embodiments of the disclosed subject matter.

Turning to FIG. 7, an example 700 of a process for presenting a video object identified based on a sequence of characters is shown in accordance with some embodiments of the disclosed subject matter. In some embodiments, process 700 can be implemented on video object server 204.

Process 700 can begin by receiving a sequence of characters from a first user device at 702. As described above in connection with FIG. 1B, the sequence of characters can include any suitable characters and can be of any suitable length. In some embodiments, process 700 can receive a block of text and can isolate the sequence of characters within the block of text by identifying particular delimiting characters that differentiate the sequence of characters from other text (e.g., text in a comment). As another example, in some embodiments, process 700 can parse a comment and/or message to identify a sequence of characters that correspond to a video object. In some embodiments, hardware processor 302 of video object server 204 can implement any suitable text parsing techniques to identify a sequence of characters.

Process 700 can identify a video object to be presented by a second user device based on the received sequence of characters at 704 using any suitable technique or combination of techniques. For example, in some embodiments, process 700 can identify a content creator associated with the video object and identify the video object from a collection of video objects associated with the content creator. As a more particular example, in some embodiments, an identifier associated with the content creator can be included in the sequence of characters, and process 700 can use the identifier to identify the content creator. As another example, in some embodiments, the sequence of characters can contain an identifier of the video object, and process 700 can parse the sequence of characters to determine the identifier of the video object.

Process 700 can cause the identified video object to be presented by the second user device at 706. In some embodiments, any suitable technique(s) can be used, for example, those described above in connection with FIG. 5.

Process 700 can receive an indication that the presented video object has been selected using the second user device at 708. The received indication can contain any suitable information, for example, as described above in connection with FIGS. 4 and 5.

Process 700 can identify a video associated with the video object at 710 using any suitable technique or combination of techniques. For example, an identifier associated with the video can be included in a link associated with the selected video object, and process 700 can determine the identifier from the link to identify the video.

Process 700 can cause the identified video to be presented by the second user device at 712. Process 700 can use any suitable technique or combination of techniques to cause the identified video to be presented, for example, those described above in connection with 516 of FIG. 5.

Figure 8:
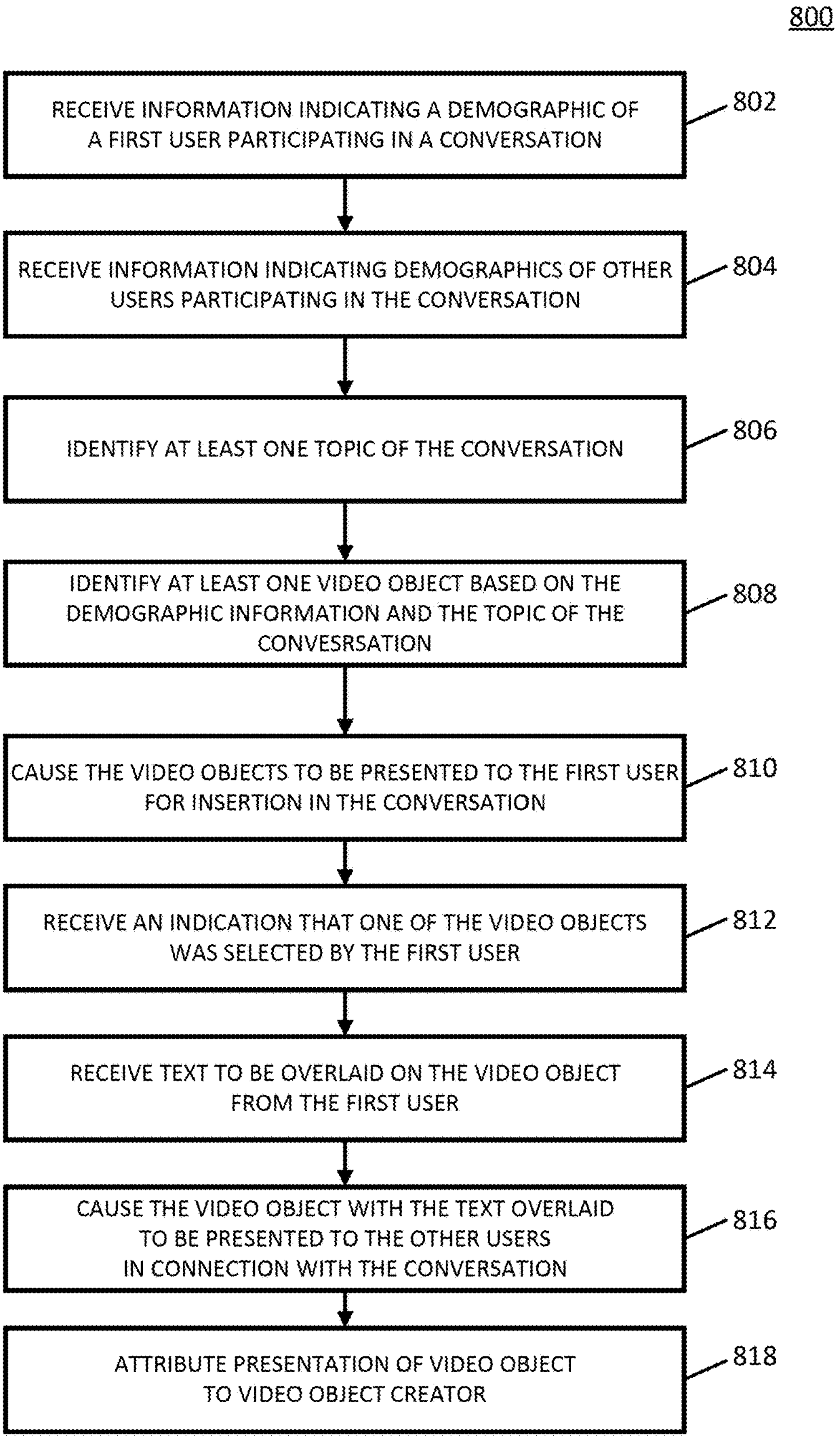
FIG. 8 shows an example of a process for identifying a video object for presentation in a conversation based on content of a conversation in accordance with some embodiments of the disclosed subject matter.

Turning to FIG. 8, an example 800 of a process for identifying a video object based on content of a conversation is shown in accordance with some embodiments of the disclosed subject matter. Note that, although process 800 is described with respect to identifying a video object to be presented in a chat and/or online conversation, in some embodiments, the techniques described below can be used to identify a video object for presentation in a comment on a social networking site, in a text message, in an e-mail, and/or in any other suitable message.

Process 800 can receive information indicating demographic attributes of a first user participating in a conversation at 802. In some embodiments, the first user can be participating in a chat and/or online conversation with any suitable number of chat participants. Process 800 can receive the demographic information using any suitable technique or combination of techniques. For example, in some embodiments, process 800 can access a demographic profile that stores the demographic attributes in connection with an identifier of the first user (e.g., a username, and/or any other suitable identifier(s)).

Process 800 can receive information indicating demographic attributes of other users participating in the conversation at 804. As described above in connection with block 802, the received demographic attributes can be received in any suitable manner and using any suitable techniques.

Note that, in some embodiments, which demographic attributes are used and/or stored by process 800 can be controlled by the user. For example, in some embodiments, a user can specify information that is to be transmitted to a server, stored, and/or used via a user interface on a web page, an application running on a user device, and/or in any other suitable manner Additionally, in some embodiments, the user can modify settings that indicate the information that is transmitted to the server, stored, and/or used at any suitable time.

Process 800 can identify at least one topic associated with the conversation at 806. For example, in some embodiments, process 800 can determine if the conversation relates to a particular item of media content (e.g., a particular television program, a particular movie, a particular book, and/or any other suitable media content item), a particular event (e.g., a concert, a debate, a game, a sporting event, and/or any other suitable type of event), and/or any other suitable type of topic. In some embodiments, process 800 can additionally or alternatively identify a sentiment associated with the conversation. For example, in some embodiments, process 800 can determine if a tone associated with one or more comments in the conversation corresponds to a sentiment such as excitement, disbelief, anger, and/or any other suitable sentiment. As a more particular example, in instances where participants in a conversation are discussing a sporting event, process 800 can determine if comments entered in the conversation are expressing excitement, disbelief, and/or any other suitable sentiment with regard to a player or team's performance in the sporting event. As another more particular example, in instances where participants in a conversation are discussing a debate, process 800 can determine if comments entered in the conversation are expressing excitement, anger, confusion, and/or any other suitable sentiment with regard to responses in the debate.

Process 800 can use any suitable technique or combination of techniques to identify the topic and/or sentiments associated with the conversation. For example, in some embodiments, process 800 can identify keywords in the conversation that identify media content, events, and/or other topics being discussed. As a more particular example, in some embodiments, the keywords can include names of media content items, names of actors/actresses, names of events, and/or any other suitable keywords. As another example, in some embodiments, the keywords can include words that are known to indicate a particular sentiment, such as "yay," "oh no," and/or any other suitable words that indicate sentiment. In some embodiments, process 800 can maintain a list of keywords and can scan a comment or message to determine if a keyword is included in the comment or message. Additionally or alternatively, in some embodiments, process 800 can use any suitable natural language processing techniques and/or machine learning techniques to identify the topic and/or sentiments associated with the conversation.

Process 800 can identify at least one video object based on the demographic attributes and the identified topics and/or sentiments at 808. For example, in some embodiments, process 800 can identify a video object based on the demographic attributes by identifying video objects associated with media content that is popular with viewers associated with the same attributes. As a more particular example, in some embodiments, the identified video object can correspond to a portion of the media content item (e.g., a particular episode of a television program, a particular movie, and/or any other suitable media content item) popular with viewers associated with the same demographic attributes. In some such embodiments, the video object can be identified using aggregated demographic information that corresponds to a population of users. Note that, in some embodiments, process 800 can first determine that one or more users participating in the online conversation have consented to use of demographic attributes to select a video object for inclusion in the online conversation. For example, in an instance where two users are participating in an online conversation, process 800 can determine that both users have consented to use of demographic attributes for identification of video objects, and process 800 can then identify one or more video objects based on the demographic attributes associated with both users. As a more particular example, in some embodiments, process 800 can identify one or more video objects based on demographic attributes shared by the two users.

As another example, in some embodiments, process 800 can identify a video object based on an identified topic. As a more particular example, if process 800 determined that a topic of the conversation is a particular sporting event, process 800 can identify a video object associated with the particular sporting event, such as a portion of a related game, and/or any other suitable content.

As yet another example, in some embodiments, process 800 can identify a video object based on an identified sentiment associated with the conversation. As a more particular example, if process 800 determined that a sentiment of the conversation is excitement, process 800 can identify a video object that includes excited people, and/or is associated with the sentiment of excitement in any other suitable manner Note that, in some embodiments, process 800 can identify any suitable number (e.g., one, two, five, ten, and/or any other suitable number) of video objects using these techniques.

In some embodiments, process 800 can identify the video object using criteria specified by a creator of the video object. For example, in some embodiments, the creator of the video object can specify populations of users that might enjoy the video object (e.g., by indicating particular demographic attributes), general interests (e.g., particular sports, particular hobbies, particular music groups, and/or any other suitable general interests) of users that might enjoy the video object, media content related to and/or associated with the video object, one or more topics associated with the video object, sentiments associated with the video object, and/or any other suitable information. Process 800 can use the topics and sentiments associated with the conversation and demographic attributes associated with participants in the conversation to identify a corresponding video object based on the information specified by the creator of the video object. In some embodiments, information specified by the creator of the video object can be stored in any suitable manner, such as in a database on video object server 204.

Process 800 can cause the identified video object(s) to be presented to the first user at 810. In some embodiments, the video object(s) can be presented in a group of video objects that are available for selection, as shown in and described above in connection with FIG. 1C. In some such embodiments, the group of video objects available for selection can include a mix of video objects that were identified based on the content of the conversation and/or the demographic attributes of users participating in the conversation and generic video objects that were not identified as relevant to the conversation. In some embodiments, process 800 can cause the identified video object(s) to be presented in connection with an indication that the video object(s) were identified as relevant to the conversation.

Process 800 can receive an indication that one of the video objects (e.g., in a group of video objects available for selection, as shown in FIG. 1C) was selected by the first user at 812. For example, in some embodiments, process 800 can receive an indication that one of the video objects presented in the group of identified video object(s) was touched, clicked, and/or selected in any suitable manner on a user device associated with the first user.

Process 800 can receive text from a user device associated with the first user at 814. As shown in and described above in connection with FIG. 1D, in some embodiments, process 800 can receive the text from a text input box presented in a user interface. In some embodiments, the text can be of any suitable length (e.g., a word, a sentence, multiple sentences, and/or any other suitable length).

Process 800 can cause the video object to be presented with the received text overlaid on the video object at 816. Process 800 can cause the text to be overlaid in any suitable manner. For example, in some embodiments, process 800 can cause the text to be positioned at any suitable location on the video object. As another example, in some embodiments, process 800 can scale the size of the text based on the amount of text. In some embodiments, process 800 can cause the video object with overlaid text to be presented within a comment and/or message in the conversation.

Process 800 can attribute presentation of the video object at 818. For example, in some embodiments, process 800 can store an indication that the video object was used in a conversation in association with an identifier of the creator of the video object. In some embodiments, the attribution can be used to provide payment to the creator of the video object. For example, in some embodiments, the creator of the video object can receive payment for each instance of the video object being inserted in a message or conversation. Note that, in some embodiments, indications can be stored when the video object is shared (e.g., used by other users either in the conversation or in other conversations), endorsed (e.g., liked and/or promoted by other users), and/or reappears in any other suitable context (e.g., in a group of recently used video objects). In some such embodiments, payment to the creator of the video object can depend on a context of how the video object was presented. For example, in some embodiments, different amounts can be paid for initial use of the video object, sharing of the video object, each endorsement of the video object, and/or any other suitable type of engagement with the video object.

In some embodiments, at least some of the above described blocks of the processes of FIGS. 4-8 can be executed or performed in any order or sequence not limited to the order and sequence shown in and described in connection with the figures. Also, some of the above blocks of FIGS. 4-8 can be executed or performed substantially simultaneously where appropriate or in parallel to reduce latency and processing times. Additionally or alternatively, some of the above described blocks of the processes of FIGS. 4-8 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as magnetic media (such as hard disks, floppy disks, and/or any other suitable magnetic media), optical media (such as compact discs, digital video discs, Blu-ray discs, and/or any other suitable optical media), semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems described herein collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personal information is removed. For example, a user's identity may be treated so that no personal information can be determined for the user, or a user's geographic location may be generalized where location information is obtained (such as to a city, ZIP code, or state level), so that a particular location of a user cannot be determined. Thus, the user may have control over how information is collected about the user and used by a content server.

Accordingly, methods, systems, and media for inserting and presenting video objects are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method in a server, the method comprising:

receiving, by one or more processors, a sequence of characters from a first user device operated by a first user;

identifying, by the one or more processors from a plurality of sets of frames, a first group of sets of frames each comprising one or more respective frames based on one or more sentiments identified from the sequence of characters, wherein the one or more sentiments are identified by applying one or more natural language processing techniques to the sequence of characters;

selecting, by the one or more processors from the first group of sets of frames, a second group of sets of frames comprising one or more respective frames based on a frequency of use of sets of frames in the first group of sets of frames by other users;

providing, by the one or more processors, the second group of sets of frames to the first user device; and in response to receiving, from the first user device, a selection of a set of frames from the second group, providing the selected set of frames to a second user device.

2. The method of claim 1, wherein selecting the set of frames is based on a relationship between the user and one or more content creators associated with the second group of sets of frames.

3. The method of claim 2, wherein the sequence of characters includes an identifier of a video object including an identifier of the set of frames, and wherein selecting the set of frames is based on (i) the identifier and (ii) the relationship between the first user and the one or more content creators.

4. The method of claim 2, wherein selecting the second group of sets of frames is based on (i) a channel corresponding to the sequence of characters and (ii) the relationship between the first user and the one or more content creators.

5. The method of claim 1, wherein the sequence of characters corresponds to an online conversation between the first user and a second user.

6. The method of claim 1, wherein providing the selected set of frames to the second user device causes the second user device to render the selected set of frames.

7. The method of claim 1, wherein providing the selected set of frames to the second user device causes the second user device to replace at least a portion of the sequence of characters with the selected set of frames.

8. The method of claim 1 wherein selecting the second group of sets of frames is based on (i) the sequence of characters and (ii) the first user having a connection to a content creator on a social networking service.

9. The method of claim 1, wherein selecting the second group of sets of frames is based on (i) the sequence of characters and (ii) the first user having a subscription corresponding to a content creator.

10. The method of claim 1, wherein applying one or more natural language processing techniques to the sequence of characters includes identifying one or more keywords from the sequence of characters.

11. A system comprising:

one or more processors configured to:

receive a sequence of characters from a first user device operated by a first user;

identify, from a plurality of sets of frames, a group of sets of frames each comprising one or more respective frames based on one or more sentiments identified from the sequence of characters, wherein the one or more sentiments are identified by applying one or more natural language processing techniques to the sequence of characters;

select, from the first group of sets of frames, a second group of sets of frames comprising one or more respective frames based on a frequency of use of sets of frames in the first group of sets of frames by other users;

provide the second group of sets of frames to the first user device; and in response to receiving, from the first user device, a selection of a set of frames from the second group, provide the selected set of frames to a second user device.

12. The system of claim 11, wherein selecting the set of frames is based on a relationship between the user and one or more content creators associated with the first group of sets of frames.

13. The system of claim 12, wherein the sequence of characters includes an identifier of a video object including an identifier of the set of frames, and wherein selecting the set of frames is based on (i) the identifier and (ii) the relationship between the first user and the one or more content creators.

14. The system of claim 12, wherein selecting the second group of sets of frames is based on (i) a channel corresponding to the sequence of characters and (ii) the relationship between the user and the one or more content creators.

15. The system of claim 11, wherein the sequence of characters corresponds to an online conversation between the first user and a second user.

16. The system of claim 11, wherein providing the selected set of frames to the second user device causes the second user device to render the selected set of frames.

17. The system of claim 11, wherein providing the selected set of frames to the second user device causes the second user device to replace at least a portion of the sequence of characters with the selected set of frames.

18. The system of claim 11, wherein selecting the second group of sets of frames is based on (i) the sequence of characters and (ii) the user having a connection to a content creator on a social networking service.

19. The system of claim 11, wherein selecting the second group of sets of frames is based on (i) the sequence of characters and (ii) the user having a subscription corresponding to a content creator.

20. The system of claim 11, wherein applying one or more natural language processing techniques to the sequence of characters includes identifying one or more keywords from the sequence of characters.

* * * * *